United States Patent
Hoffjann et al.

(10) Patent No.: US 8,869,543 B2
(45) Date of Patent: Oct. 28, 2014

(54) COOLING ASSEMBLY FOR COOLING A THERMAL BODY FOR AN AIRCRAFT

(75) Inventors: Claus Hoffjann, Hamburg (DE); Hansgeorg Schuldzig, Jork (DE)

(73) Assignee: Airbus Operations GmbH (DE)

( * ) Notice: Subject to any disclaimer, the term of this patent is extended or adjusted under 35 U.S.C. 154(b) by 1659 days.

(21) Appl. No.: 11/906,093

(22) Filed: Sep. 28, 2007

(65) Prior Publication Data

US 2010/0024438 A1 Feb. 4, 2010

Related U.S. Application Data

(60) Provisional application No. 60/848,560, filed on Sep. 28, 2006.

(30) Foreign Application Priority Data

Sep. 28, 2006 (DE) .......................... 10 2006 046 114

(51) Int. Cl.
| | |
|---|---|
| F25B 21/02 | (2006.01) |
| B60H 1/32 | (2006.01) |
| B64D 13/00 | (2006.01) |
| B64D 13/06 | (2006.01) |
| B64D 41/00 | (2006.01) |

(52) U.S. Cl.
CPC ...... *B64D 13/006* (2013.01); *B64D 2013/0674* (2013.01); *B64D 2041/005* (2013.01); *Y02T 90/36* (2013.01); *Y02T 50/44* (2013.01); *F25B 21/02* (2013.01)
USPC ........ 62/3.61; 63/3.2; 63/3.3; 63/3.4; 63/239; 429/433; 429/436

(58) Field of Classification Search
CPC ...... F25B 21/02; B64D 13/06; B64D 13/006; Y02T 50/44; Y02T 50/56; B60H 1/00014; B60H 1/00478; B63J 2/12
USPC ............... 62/3.61, 3.2, 3.3, 3.4; 429/436, 433
See application file for complete search history.

(56) References Cited

U.S. PATENT DOCUMENTS

| | | | | |
|---|---|---|---|---|
| 4,355,518 | A * | 10/1982 | Beitner | 62/3.61 |
| 6,119,463 | A * | 9/2000 | Bell | 62/3.7 |
| 6,649,298 | B2 * | 11/2003 | Hayashi et al. | 429/433 |
| 6,696,186 | B1 * | 2/2004 | Herdeg et al. | 429/414 |
| 7,743,614 | B2 * | 6/2010 | Goenka et al. | 62/3.3 |
| 7,779,639 | B2 * | 8/2010 | Goenka | 62/3.61 |
| 8,118,257 | B2 * | 2/2012 | Wilmot et al. | 244/118.5 |
| 2003/0230332 | A1 * | 12/2003 | Venkatasubramanian et al. | 136/205 |
| 2005/0039959 | A1 * | 2/2005 | Fruhauf et al. | 180/65.3 |
| 2005/0266287 | A1 * | 12/2005 | Hoffjann et al. | 429/26 |
| 2010/0011781 | A1 * | 1/2010 | Lents et al. | 62/3.7 |

FOREIGN PATENT DOCUMENTS

| | | |
|---|---|---|
| DE | 1 580 634 | 9/1970 |
| DE | 691 15 982 T2 | 5/1996 |
| DE | 199 04 202 A1 | 8/2000 |

(Continued)

*Primary Examiner* — Allen Flanigan
*Assistant Examiner* — Filip Zec
(74) *Attorney, Agent, or Firm* — Lerner, David, Littenberg, Krumholz & Mentlik, LLP

(57) ABSTRACT

A cooling assembly for cooling a thermal body for an aircraft. The cooling assembly has a Peltier element with a hot side and a cold side. Furthermore, the cooling assembly has a thermal body. The thermal body is arranged in heat-conductive contact with the cold side of the Peltier element. The hot side of the Peltier element is adapted to dissipate thermal energy to an aircraft structure, such that the thermal body may be cooled.

13 Claims, 3 Drawing Sheets

(56) References Cited

FOREIGN PATENT DOCUMENTS

| | | |
|---|---|---|
| DE | 102 18 343 B4 | 11/2003 |
| EP | 1 331 838 A2 | 7/2003 |
| GB | 947231 | 1/1964 |
| JP | 2001 183 026 A | 7/2001 |
| JP | 2002-115926 | 4/2002 |
| WO | WO-99/04439 | 1/1999 |
| WO | WO-2004/080845 A1 | 9/2004 |

* cited by examiner

COOLING ASSEMBLY FOR COOLING A THERMAL BODY FOR AN AIRCRAFT

CROSS-REFERENCE TO RELATED APPLICATIONS

This application claims the benefit of the filing date of U.S. Provisional Patent Application No. 60/848,560 filed Sep. 28, 2006, the disclosure of which is hereby incorporated herein by reference.

BACKGROUND OF THE INVENTION

The present invention relates to a cooling assembly and a method for cooling a thermal body for an aircraft as well as the use of a cooling device in an aircraft and an aircraft having a cooling device.

Up to now, cooling systems have been known in aircrafts, whose coolers are housed in ram air channels to achieve a heat exchange between an internal heat source and the environment of the aircraft. These ram air channels are implemented in such a way that the openings are oriented toward the flow direction of the aircraft to provide sufficient cool air. These ram air channels are to be kept as small in construction as possible for reasons of efficiency, such that unnecessary air resistance does not arise.

In order that sufficient cool air may be provided from the environment, obtaining pressurized air from a bleed air system of a turbine of an aircraft is also known. Pressurized air is taken from an aircraft power plant, because of which the air mass flow in the power plant is reduced.

Using these ram air channels, aircraft components, such as fuel-cell systems, may be cooled. Therefore, these fuel-cell systems, which are preferably PEM fuel-cell systems (polymer membrane fuel-cell systems) for obtaining electrical power, are equipped with such air cooling. Furthermore, cooling these aircraft components and/or fuel-cell systems using liquid cooling systems is known, the cooling liquid being cooled using externally supplied ram air.

Generating water from the cathode exhaust air of the fuel-cell system is also known on the basis of the cooling of the fuel cells. The cathode exhaust air may be cooled in such a way that the water contained therein may be condensed out. The condensation may be achieved by a heat exchanger which is connected to a cooling system, whether it is a liquid cooling system or an air cooling system. These liquid cooling systems or an air cooling system may be cooled using externally supplied cooling media.

SUMMARY OF THE INVENTION

According to an exemplary embodiment of the present invention, a cooling assembly for cooling a thermal body for an aircraft and by a method for cooling a thermal body for an aircraft and the use of the cooling assembly for cooling a thermal body in an aircraft and an aircraft having a cooling assembly for cooling a thermal body according to the independent claims are provided.

According to a first exemplary embodiment of the present invention, a cooling assembly for cooling a thermal body for an aircraft is provided. The cooling assembly has a Peltier element with a hot side and a cold side. Furthermore, the cooling assembly has a thermal body. The thermal body may be arranged in heat-conductive contact with the cold side of the Peltier element. The hot side of the Peltier element may be adapted to dissipate thermal energy to an aircraft structure, such that the thermal body is coolable.

This may provide for a cooling assembly for cooling a thermal body for an aircraft.

According to a further exemplary embodiment of the present invention, a method for cooling a thermal body for an aircraft is provided. A thermal body may be arranged in heat-conductive contact with a cold side of a Peltier element. Thermal energy may be dissipated using a hot side of the Peltier element to an aircraft structure, such that the thermal body may be cooled.

According to a further exemplary embodiment, the cooling assembly described above may be used in an aircraft.

According to a further exemplary embodiment, an aircraft having one of the cooling assemblies described above is provided.

The term Peltier element may be understood to mean semiconductor elements in which one side heats up and the other side cools down due to application of a voltage. Upon introduction of a thermal load onto the cool side or the cold side and by controlling the applied voltage, the heat sink or the heat difference between hot side and cold side may be determined precisely. The heat on the hot side of the Peltier element has to be dissipated. A Peltier element may be thus used as a controllable mediator between a heat source and a heat sink, without requiring the use of liquids or gases for thermal transport. The greater the temperature difference between heat source and heat sink, the less the electrical power is needed to operate the Peltier element. The basis for the Peltier effect is the contact of two metals which have different levels of the conducting bands. If one conducts a current through two contact points, which are arranged one behind the other, thermal energy may be absorbed at the one contact point, i.e., the cold side, such that the electron reaches the higher conducting bands of the neighboring metal. At the other contact point, i.e., the hot side of the Peltier element, the electron falls from a higher energy level to a lower energy level, such that thermal energy may be dissipated here. If the thermal energy of the hot side may not be transported away sufficiently, the electrical energy must be increased on the hot side of the Peltier element to maintain the temperature of the cold side.

The term "heat-conductive contact" may be understood as a connection of two elements through which thermal energy may be transported. A heat-conductive contact may be provided, for example, by a contact surface by means of contact of two elements. Materials having a high heat conductance value are suitable.

The term "cold environment" may be understood, for example, as the environment of an aircraft or the exterior of an aircraft fuselage, which may be approximately −80° C.--60° C. at a cruising altitude of the aircraft. Furthermore, there may be a temperature difference of 80° C. to 120° C. between the cold environment. The cooling device may be adapted to be in heat-conductive contact inside the aircraft structure in such a way that an active area of the cold environment also exists, i.e., in that temperatures of below 0° C. exist.

The term "aircraft structure" may be understood in the following as all components of an aircraft which are in contact with the cold environment. This means that the aircraft structure has the temperature of the cold environment. Furthermore, the aircraft structure may absorb thermal energy from the interior of an aircraft and convey it to the cold environment. The aircraft structure may comprise, for example, the aircraft fuselage, the aircraft skin, frames, or stringers.

A possibility may be provided by the present invention of cooling aircraft components and/or aircraft apparatuses without requiring a ram air channel, which may be subject to loss, or other external cooling elements for the cooling. The cooling assembly may be implemented completely internally in an aircraft. Thermal energy may be dissipated from a thermal body via the Peltier element to the cold environment without having to introduce cold ambient air into the aircraft. Because of the Peltier element, the cooling performance of the cooling assembly may be controllable without using complex control units. The temperature of the cold side of the Peltier element may be kept constant using electrical energy, such that the thermal body may be permanently cooled.

In a cold environment of an aircraft, for example, there may be a temperature difference of 100° C. to 120° C. in comparison to the interior of an aircraft, for example. The temperature difference between the cold environment of the aircraft and the waste heat of thermal bodies may be exploited by the cooling assembly to transport thermal energy.

According to a further exemplary embodiment, the cooling assembly also has a cooling device. The cooling device may be retained between the thermal body and the aircraft structure in such a way that the thermal energy may be dissipated from the Peltier element to the aircraft structure using the cooling device. Further cooling elements, which improve the heat transport of the thermal energy, may be used between the Peltier element and the aircraft structure via the cooling device. The heat transport may be improved in that the thermal energy of the hot side of the Peltier element may be dissipated in an improved way. For example, the cooling device may absorb thermal energy of the hot side using coolants or air flows. Therefore, the cooling performance of the Peltier element may be improved. The temperature difference between the hot side and the cold side may be provided using lower power consumption due to the better heat dissipation from the hot side of the Peltier element.

According to a further exemplary embodiment, the cooling device forms a closed air channel. Furthermore, the cooling device has a fan to generate an air flow in the air channel. The cooling device may be adapted to absorb thermal energy from the hot side of the Peltier element using the air flow and dissipate it to the aircraft structure. More thermal energy may be absorbed from the hot side of the Peltier element and dissipated because of the generation of an air flow. The hot side thus heats up less, such that there may be a smaller temperature difference between the hot side and the cold side of the Peltier element. Therefore, less current may be needed to maintain a constant temperature of the cold side of the Peltier element.

According to a further exemplary embodiment, the cooling assembly also has a control unit, the control unit being adapted to control the fan. The fan may generate an air flow variably, such that a cooling performance of the cooling assembly may be adjustable. At lower speed of the fan, a slower air flow may be generated, such that less thermal energy may be absorbed from the hot side of the Peltier element. At higher cooling performance, the speed of the fan may be increased, such that a more rapid air flow may be generated, which may absorb more thermal energy from the hot side of the Peltier element. The air flow may in turn dissipate the thermal energy to the cooling device. Therefore, the performance of the cooling assembly may be controllable in a simple way. Because of the closed cooling air channel, complex apparatuses for exhausting used or hot cooling air do not have to be installed, such that costs and weight may be saved.

According to a further exemplary embodiment, the cooling device has at least one first cooling element having a first inflow surface, wherein the first inflow surface being able to have the air flow flow against it in such a way that thermal energy may be absorbed using a first cooling element. The first cooling element may be adapted to dissipate thermal energy to the cooling device. Therefore, the first cooling element provides a larger inflow surface for the air flow, such that more thermal energy may be dissipated to the aircraft structure. The cooling performance may thus be improved overall.

According to a further exemplary embodiment, the cooling assembly has at least one second cooling element having a second inflow surface, wherein the second cooling element being adapted to absorb thermal energy of the hot side of the Peltier element. The second inflow surface may have the air flow flow against it in such a way that thermal energy may be dissipated to the air flow. The second cooling element thus enlarges the inflow surface of the hot side of the Peltier element, such that more thermal energy may be dissipated from the hot side to the air flow. The cooling performance may thus be improved overall.

According to a further exemplary embodiment, the cooling device has air deflector plates for controlling the air flow. Therefore, the air flow may be guided past the hot side of the Peltier element or the first or second cooling element in a targeted way, such that improved cooling performance may be obtained.

According to a further exemplary embodiment, the thermal body may be an aircraft apparatus. The cooling device having the Peltier element may thus be arranged directly on the aircraft apparatuses to be cooled, without using heat conduction systems. Good efficiency of the cooling assemblies may thus be achieved, because heat conduction systems are often subjected to loss.

The term "aircraft apparatus" may be understood as all consumers or devices of an aircraft which generate heat.

According to a further exemplary embodiment, the cooling assembly also has a feed pipe and a drain pipe. The thermal body has a fluid channel. The feed pipe may be adapted to provide a fluid with a first temperature from the aircraft apparatus to the fluid channel. The fluid channel may be adapted to dissipate the thermal energy of the fluid to the thermal body, the fluid being able to be provided to the drain pipe with a second temperature. Therefore, an aircraft apparatus which may be arranged at a distance may be cooled in that a cold fluid with a second temperature absorbs the heat of the aircraft apparatus and removes it. All aircraft apparatuses of an aircraft may thus be cooled using the cooling assembly.

The term "fluid" may be understood as all liquid or gaseous media which may absorb, dissipate, or transport thermal energy.

According to a further exemplary embodiment, the cooling assembly also has a condensate precipitator, the condensate precipitator being connected to the first drain pipe. The fluid comprises cathode exhaust air of a fuel-cell system. The cathode exhaust air may be fed to the condensate precipitator using the first drain pipe, the condensate precipitator being adapted to precipitate a condensed water component of the cathode exhaust air. Fuel-cell systems, such as PEM fuel-cell systems (polymer membrane fuel-cell systems), for example, produce hot cathode exhaust air as a product. A high proportion of vaporized water may be found in the cathode exhaust air. The cathode exhaust air may be conveyed using the feed pipe to the thermal body, the cathode exhaust air being able to be cooled, condensing out the water component of the cathode exhaust air. The condensate precipitator removes the condensed water component, which may be processed further. Water may thus be obtained from the cathode exhaust air and processed further.

According to a further exemplary embodiment, the cooling assembly also has a condensate storage tank, the condensed water component being able to be fed to the condensate storage tank. The water component may be fed to a drinking water system. The condensed water component may thus be reused as drinking water. The amount of drinking water which may be carried along may thus be reduced, such that weight and costs may be saved.

According to a further exemplary embodiment, the drain pipe may be adapted to provide the fluid with the second temperature to the aircraft apparatus, the fluid absorbing thermal energy of the aircraft apparatus and being able to be provided with the first temperature to the feed pipe. The fluid may thus transport thermal energy away from the aircraft apparatus and dissipate it to the thermal body. A coolant loop may thus be provided, without the fluid for cooling having to be refilled.

According to a further exemplary embodiment, the aircraft apparatus may be a fuel-cell system. Thermal energy, which has to be dissipated, arises in the fuel-cell system because of the exothermic reaction between oxygen and hydrogen. Therefore, cooling of the fuel-cell system may be provided using the fluid channel, the cooling assembly being implemented completely internally in an aircraft.

According to a further exemplary embodiment, the cooling device and the thermal body are implemented integrally. Connection means between the cooling device and the heat body may thus be dispensed with. Installation space and weight may be saved if the cooling device and the thermal body are implemented integrally and/or in one piece, and if the connection elements are thus saved.

According to a further exemplary embodiment, the cooling device has a plurality of Peltier elements. A cooling performance may be set on the basis of the number of installed Peltier elements. According to a further exemplary embodiment, the cooling assembly has at least one of the plurality of first cooling elements, second cooling elements, and cooling devices. The cooling assembly may thus be set precisely to a required cooling performance.

According to a further exemplary embodiment, the aircraft structure may be selected from the group comprising cylindrical aircraft fuselages, stringers, and frames. The cooling device may thus be attached in a space-saving way along the aircraft structures.

The embodiments of the cooling assembly also apply for the method, for the aircraft, and for the use, and vice versa.

BRIEF DESCRIPTION OF THE DRAWINGS

In the following, exemplary embodiments are described in greater detail with reference to the attached drawings for explanation and better understanding of the present invention.

DETAILED DESCRIPTION

Figure 1:
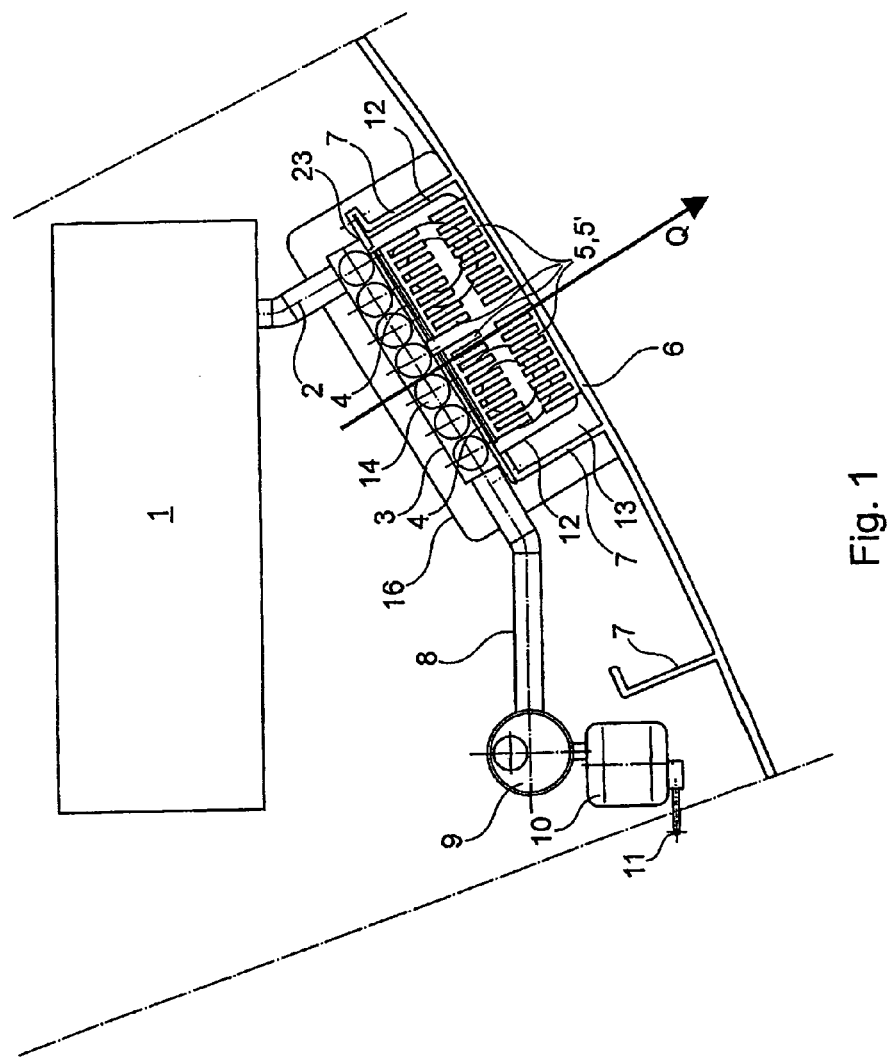
FIG. 1 shows a schematic illustration of the cooling assembly according to an exemplary embodiment of the present invention, in which hot air may be cooled.

Identical or similar components in different figures are provided with identical reference numerals. The illustrations in the figures are schematic and are not to scale.

An exemplary embodiment of the present invention is schematically illustrated in FIG. 1. FIG. 1 shows an exemplary embodiment of the cooling assembly for cooling a thermal body for an aircraft. The cooling assembly has a Peltier element 4 having a hot side and a cold side. Furthermore, the cooling assembly has the thermal body 3. The thermal body 3 is arranged in heat-conductive contact with a cold side of the Peltier element 4, the hot side of the Peltier element 4 being adapted to dissipate thermal energy Q to an aircraft structure 6, 7, 18, such that the thermal body 3 may be cooled.

FIG. 1 additionally shows a cooling device 13 having a cooling surface 23. The thermal body 3 is arranged on the cooling surface 23. Peltier element 4 has a hot side and a cold side, the cold side of the Peltier element 4 being adapted to be in heat-conductive contact with the cooling surface 23 of the cooling device 13. The Peltier element 4 is adapted to absorb the thermal energy Q of the thermal body 3 using the cold side and to dissipate the thermal energy Q to the cooling device 13 using the hot side. The cooling device 13 is adapted to be in heat-conductive contact within an aircraft structure 6, 7, 18, such that the thermal energy Q may be dissipated to a cold environment 24 of the aircraft. The thermal body 3 may be cooled by the thermal energy transport.

The cooling assembly may be arranged on an interior of an aircraft fuselage 6, such that openings to the outside and/or ram air channels are not necessary for the cooling. FIG. 1 shows that the cooling device 13 may be arranged on the interior of the aircraft skin 6 or on transverse girders or the stringers 7 of an aircraft. The cooling device 13 is adapted to be in heat-conductive contact inside these aircraft structures 6, 7, such that the thermal energy may be dissipated to the aircraft structures 6, 7. The cooling device 13 may also be arranged tangentially along the aircraft fuselage 6 or run axially along the aircraft longitudinal axis. The cooling device 13 may also form a closed air channel. Fans 12 for generating an air flow are arranged in the cooling device 13. Air circulation and/or an air flow may thus be achieved, which may absorb thermal energy better from the hot side of the Peltier element 4. The air channel may also be implemented as closed, such that the air flow is generated in the interior using the fan 12 without having to provide an air mass exchange. Other installed elements may thus not be disturbed by an exiting air flow of the cooling assembly.

Furthermore, first and second cooling elements 5, 5', which have a first and a second inflow surface, may be arranged in the cooling device 13. The inflow surface may have the air flow flow against it, such that it may better absorb the thermal energy Q from the first cooling element 5 and may dissipate it better from the second cooling element. The first cooling element is adapted to be in heat-conductive contact with the aircraft structure, such that the thermal energy Q may be dissipated better. The second cooling elements 5' are arranged in heat-conductive contact with the hot side of the Peltier element 4, in order to dissipate the thermal energy better to the air flow. FIG. 1 shows that the first and second cooling elements 5, 5' project into the cooling device 13 to thus increase the inflow surface and thus the heat exchange. Furthermore, the cooling air channel may have air deflector plates, such that the air flow may be controlled in a targeted way, in order to dissipate thermal energy Q better.

Furthermore, the thermal body 3 may have a fluid channel 14 for conveying a fluid. The fluid is fed to the fluid channel using a feed pipe 2. The fluid has a first hot temperature. The thermal energy Q of the fluid may be dissipated to the thermal body 3 in the fluid channel 14, such that the fluid may be cooled. The fluid may then be provided at a cold or second temperature to a drain line 8. The fluid may comprise cathode exhaust air of a fuel-cell system 1, for example. The cathode exhaust air has a high proportion of water, which may be condensed out by the cooling in the thermal body 3. The cold cathode exhaust air 8 may be fed to a condensate precipitator, which precipitates the condensed water component of the cold cathode exhaust air 8. The condensed water component may be fed to a condensate storage tank 17 and subsequently processed further.

Furthermore, the cooling device may be enclosed by insulation 16, which may help to avoid thermal energy exchange with the interior of the aircraft, such as the cabin.

Figure 2:
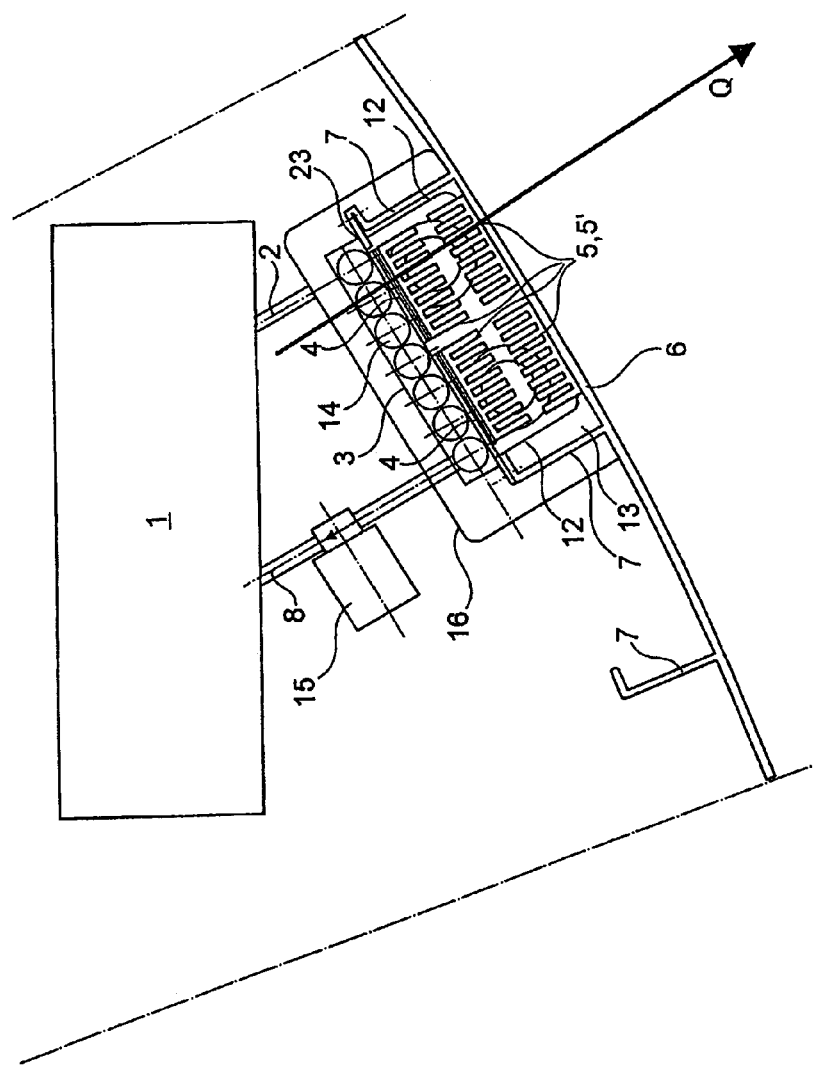
FIG. 2 shows a schematic illustration of an exemplary embodiment of the cooling assembly, by means of which a coolant may be cooled.

FIG. 2 shows an exemplary embodiment of the cooling assembly, in which a coolant loop of the fluid is provided using the thermal body 3, to cool an aircraft apparatus 1. A hot fluid with a first temperature is conveyed out of an aircraft apparatus 1 to the fluid channel 14 via a first feed channel 16, the fluid being cooled by dissipating thermal energy Q. Subsequently, the cold fluid is conveyed back to the aircraft apparatus 1 using the second drain pipe 8, to again absorb thermal energy of the aircraft apparatus 1 and thus cool it. This aircraft apparatus 1 may comprise a fuel-cell system, for example.

Furthermore, a cooling pump 15 may arranged in the coolant loop, i.e., in the feed pipe 2 or one of the drain pipes. Furthermore, heat pipe tubes are also conceivable here, among which the coolant liquidated vaporizes in the event of heat and condenses back out again at a cold point.

Figure 3:
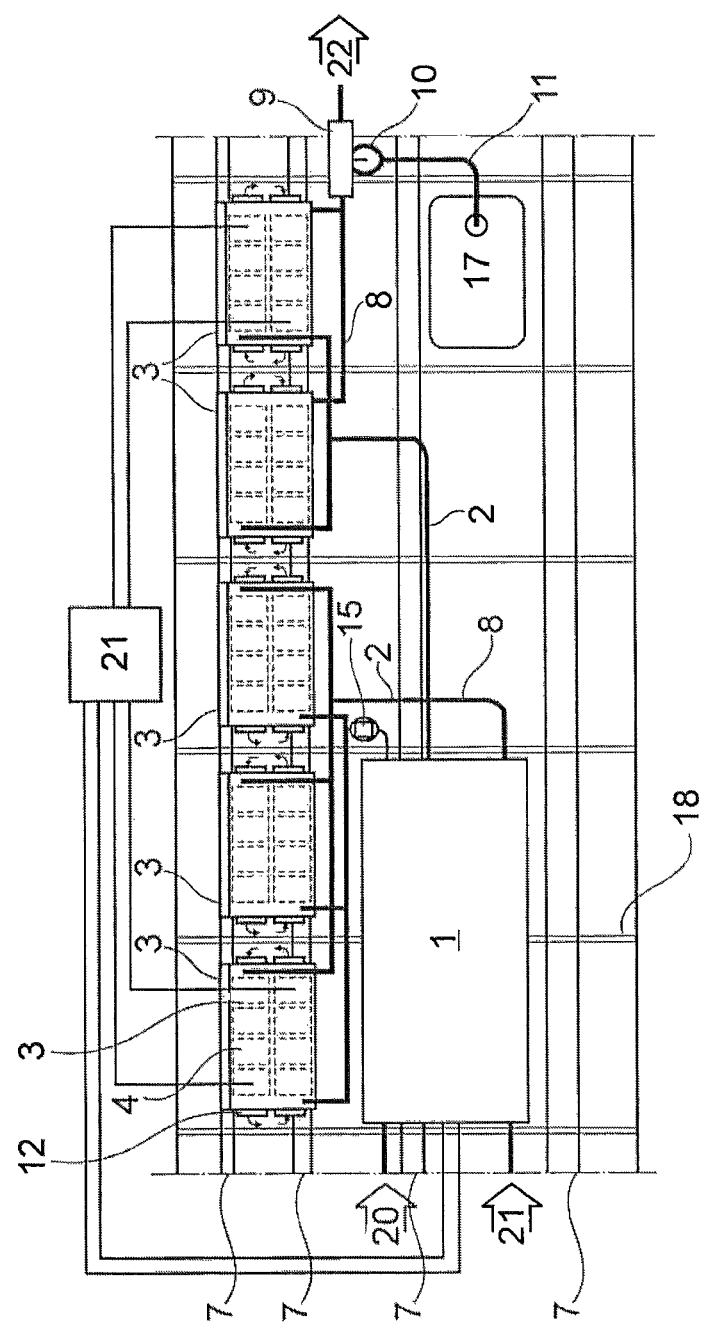
FIG. 3 shows a schematic illustration of an exemplary assembly having hot air cooling and coolant cooling.

FIG. 3 shows a combination of the exemplary embodiments from FIGS. 1 and 2, in which the cathode exhaust air of a fuel-cell system 1 is cooled and may be condensed out using the cooling device 13 and simultaneously a coolant loop may be implemented, which cools the fuel cell 1 in operation. A control unit 19 controls the operation of the fuel cell and of the cooling system as well as the power supply of the Peltier elements 4. In particular, the control unit 19 may control the fans 12 to thus control the air flow and/or the cooling performance of the cooling assembly. If the temperature of the fuel-cell 1 rises, the control unit 19 may vary the cooling performance of the cooling assembly using the fans 12.

The educts of the fuel-cell system 1 may be introduced at an air supply 20 and a fuel supply 21. The coolant loop may convey the fluid and/or the coolant and/or convey cathode exhaust air to the thermal body 3, for example. The cooled coolant after the cooling apparatuses may be fed to the fuel cell 1 again. The cathode exhaust air is cooled using the thermal body 3, such that the water component of the cathode exhaust air may be condensed out in the condensate precipitator 9. An inert gas and condensed water may be obtained from the cathode exhaust air. The inert gas results due to the fuel-cell process and comprises oxygen-poor air having an oxygen content of approximately 10% to 13%. The inert gas is removed at the inert gas drain line 22 and the condensed water is conveyed via the condensate drain 10 via the condensate relay line 11 to the condensate storage tank 17. The collected water condensate may be relayed to a drinking water system, for example. The inert gas may be used to make chambers, such as kerosene tanks, inert, such that inflammability or a risk of explosion may be reduced therein.

Moreover, it is to be noted that "comprising" does not exclude other elements or steps and "a" or "one" does not exclude multiples. Furthermore, it is to be noted that features or steps which have been described with reference to one of the above exemplary embodiments may also be used in combination with other features or steps of other exemplary embodiments described above. Reference numerals in the claims are not to be viewed as a restriction.

LIST OF REFERENCE NUMERALS 1 aircraft apparatus, fuel-cell system
2 feed pipe
3 thermal body
4 Peltier element
5 cooling element
6 aircraft fuselage
7 stringer
8 drain pipe
9 condensate precipitator
10 condensate drain
11 condensate relay line
12 fan
13 cooling device
14 fluid channel
15 coolant pump
16 insulation
17 condensate storage tank
18 frame
19 control unit
20 air supply
21 fuel supply
22 inert gas drain line
23 cooling surface
24 cold environment
Q thermal energy Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A cooling assembly for cooling an aircraft apparatus generating heat, the cooling assembly comprising:
  a feed pipe;
  a thermal body having a fluid channel, wherein a fluid with a first temperature is provided by the feed pipe from the aircraft apparatus to the fluid channel; the fluid channel being adapted to dissipate thermal energy from the fluid to the thermal body,
  a Peltier element having a hot side and a cold side;
  wherein the thermal body is arranged in heat-conductive contact with the cold side of the Peltier element; and
  a cooling device having at least one first cooling element and at least one second cooling element;
  wherein the second cooling element is arranged in heat-conductive contact with the hot side of the Peltier element and is arranged without direct heat-conductive contact with an aircraft structure, the second cooling element absorbs thermal energy from the hot side of the Peltier element and dissipates thermal energy to an air flow, when the cooling assembly is mounted to cool the aircraft apparatus;
  wherein the first cooling element is arranged in heat-conductive contact with the aircraft structure and is arranged without direct heat-conductive contact with the Peltier element, the first cooling element absorbs thermal energy from the air flow and dissipates thermal energy to the aircraft structure, when the cooling assembly is mounted to cool the aircraft apparatus; and
  wherein the first cooling element and the second cooling element are structurally spaced apart from one another.

2. The cooling assembly according to claim 1,
wherein the cooling device has air deflector plates for controlling the air flow.

3. The cooling assembly according to claim 1,
further comprising a condensate precipitator;
wherein the condensate precipitator is connected to the drain pipe;
wherein the fluid is cathode exhaust air of a fuel-cell system;
wherein the cathode exhaust air is fed to the condensate precipitator via the drain pipe; and
wherein the condensate precipitator is adapted to precipitate a condensed water component of the cathode exhaust air.

4. The cooling assembly according to claim 3,
further comprising a condensate storage tank; and
wherein the condensed water component is fed to the condensate storage tank.

5. The cooling assembly according to claim 1,
wherein the drain pipe is adapted to provide the fluid with the second temperature to the aircraft apparatus.

6. The cooling assembly according to claim 5,
wherein the aircraft apparatus is a fuel-cell system.

7. The cooling assembly according to claim 1,
wherein the cooling device and the thermal body are implemented integrally.

8. The cooling assembly according to claim 1,
wherein the cooling device has a plurality of Peltier elements.

9. The cooling assembly according to claim 1,
further comprising wherein the cooling assembly includes more than one first cooling element, second cooling element, or cooling device.

10. The cooling assembly according to claim 1,
wherein the aircraft structure is selected from the group consisting of cylindrical aircraft fuselages, stringers, frames, and a combination thereof.

11. The cooling assembly of claim 1, wherein the first cooling element and the second cooling element comprise a first and a second distinct structural elements, respectively.

12. An aircraft having a cooling assembly, the cooling assembly comprising:
a feed pipe;
a thermal body having a fluid channel, wherein a fluid with a first temperature is provided by the feed pipe from the aircraft apparatus to the fluid channel; the fluid channel being adapted to dissipate thermal energy from the fluid to the thermal body,
a Peltier element having a hot side and a cold side;
wherein the thermal body is arranged in heat-conductive contact with the cold side of the Peltier element; and
a cooling device having at least one first cooling element and at least one second cooling element;
wherein the second cooling element is arranged in heat-conductive contact with the hot side of the Peltier element and is arranged without direct heat-conductive contact with an aircraft structure, the second cooling element absorbs thermal energy from the hot side of the Peltier element and dissipates thermal energy to an air flow, when the cooling assembly is mounted to cool the aircraft apparatus;
wherein the first cooling element is arranged in heat-conductive contact with the aircraft structure and is arranged without direct heat-conductive contact with the Peltier element, the first cooling element being absorbs thermal energy from the air flow and dissipates thermal energy to the aircraft structure, when the cooling assembly is mounted to cool the aircraft apparatus, and
wherein the first cooling element and the second cooling element are structurally spaced apart from one another.

13. A method of cooling an aircraft apparatus generating heat, comprising:
a) providing a Peltier element having a hot side and a cold side;
b) arranging a thermal body in heat-conductive contact with the cold side of the Peltier element so as to absorb heat generated by the aircraft apparatus;
c) providing a cooling device having at least one first cooling element and at least one second cooling element,
wherein the second cooling element is arranged in heat-conductive contact with the hot side of the Peltier element absorbing thermal energy from the hot side of the Peltier element and dissipating thermal energy to an air flow, the second cooling element being arranged without direct heat-conductive contact with an aircraft structure; and
wherein the first cooling element is arranged in heat-conductive contact with an aircraft structure and is arranged without direct heat-conductive contact with the Peltier element, the first cooling element absorbing thermal energy from the air flow and dissipating thermal energy to the aircraft structure, and
wherein the first cooling element and the second cooling element are structurally spaced apart from one another.

* * * * *